Sept. 13, 1955 G. W. MITCHELL 2,717,926

COMMON CONTROL ARRANGEMENT IN TELEPHONE SYSTEMS

Filed Sept. 20, 1952 4 Sheets-Sheet 1

INVENTOR.
GEORGE W. MITCHELL

BY [signature]

ATTY.

Sept. 13, 1955 G. W. MITCHELL 2,717,926

COMMON CONTROL ARRANGEMENT IN TELEPHONE SYSTEMS

Filed Sept. 20, 1952 4 Sheets-Sheet 2

COMMON CONTROL CIRCUIT

INVENTOR.
GEORGE W. MITCHELL

BY Wm. Walter Owen

ATTY.

Sept. 13, 1955 G. W. MITCHELL 2,717,926

COMMON CONTROL ARRANGEMENT IN TELEPHONE SYSTEMS

Filed Sept. 20, 1952 4 Sheets-Sheet 3

INVENTOR.
GEORGE W. MITCHELL

BY [signature]

ATTY.

Sept. 13, 1955 G. W. MITCHELL 2,717,926

COMMON CONTROL ARRANGEMENT IN TELEPHONE SYSTEMS

Filed Sept. 20, 1952 4 Sheets-Sheet 4

COMMON CONTROL CIRCUIT

INVENTOR.
GEORGE E. MITCHELL
BY Wm. Walter Owen
ATTY.

United States Patent Office 2,717,926

Patented Sept. 13, 1955

2,717,926

COMMON CONTROL ARRANGEMENT IN TELEPHONE SYSTEMS

George W. Mitchell, Ann Arbor, Mich., assignor to Automatic Electric Laboratories, Inc., Chicago, Ill., a corporation of Delaware Application September 20, 1952, Serial No. 310,625

16 Claims. (Cl. 179—18)

The invention relates to automatic or semi-automatic telephone systems and more particularly to common control arrangements in such systems.

The principal purpose of such arrangements is to concentrate some of the equipment which is required merely during the setting up of a connection over a switch, in a common control unit so that after the connection has been set up this equipment becomes available again for use with other switches. Thus, taking the example of a group of selectors, the cost of these switches may be considerably reduced by providing in control apparatus common to this group of switches the relays which are necessary for directively setting a selector on a desired trunk group and for controlling its automatic hunting operation in search for an idle trunk within this group.

The association of a common control unit with an individual switch such as a selector switch of the group controlled thereby, must be accomplished speedily and without unduly increasing the cost particularly of the switches as otherwise the benefits of the common control arrangement would be at least partially nullified. This poses a difficulty especially where a plurality of control units are provided in common with a relatively large group of switches to further increase the economy of the system.

It is a primary object of the invention to provide a common control arrangement having means by which the aforementioned difficulty may be readily overcome.

It is another object of the invention to provide in a common control scheme employing switch finders individually associated with the control relay groups, means whereby as soon as a control relay group has been effectively associated, by way of its finder, with a switch requiring control service, an idle control relay group is made available for use by another switch without any unnecessary hunting on the part of the finders.

According to one feature of the invention a number of control relay groups, each having a post-selecting finder providing access to the group of switches served by these control relay groups is served in turn by a preselecting distributor switch. Thus, when a switch of the group is seized in a telephone call the finder of a control relay group preselected by the distributor switch is started in search for the switch in calling condition. More particularly and in accordance with another feature of the invention, each switch of the aforementioned group has an incoming start conductor to which a potential is applied upon seizure of the switch in a telephone call, and this potential serves to start the finder of the preselected control relay group, preferably in a circuit extending by way of the above-mentioned incoming conductor and a wiper and bank of the distributor switch directly to a finder start relay in the preselected relay group; and the aforementioned potential also serves to mark the seized switch to the switch finder as being in calling condition. In this manner the expenditure of a relay individual to the switches for starting and marking purposes is obviated.

According to another feature of the invention, in systems in which the switches used in a connection are held over the test conductor from the called end of the connection, the above-mentioned start conductor is separate from the test conductor so that the testing and holding functions exerted over the last conductor are not interfered with. A system of the aforementioned kind is disclosed, for example, in U. S. Patent No. 1,514,725 to W. T. Powell. Another feature of the invention resides in that as soon as the switch finder has found the switch in calling condition, relay means in the control relay group become operative to disassociate the distributor switch from this control relay group and cause it to preselect another idle control relay group, and cut-off relay means in this switch become operative to disconnect the start and marking potential.

More particularly and according to yet another feature of the invention there is associated with each control relay group a finder test relay which operates when the above marking potential has been found to stop the finder and advance the distributor switch, and which, upon operation of the line relay of the control relay group over the calling loop extended to that relay group by way of that finder, is placed into a local locking circuit under the control of that line relay. Upon the first release of the common line relay incident to the receipt of the first numercial impulse the above-mentioned locking circuit is opened and the finder test relay is released, and thereby the pre-operating circuit of a change-over relay also included in the control relay group is opened. In this manner the control of the aforementioned pre-operating circuit is rendered independent of off-normal contacts in the individual switches, and the circuit arrangement accordingly simplified.

Again taking the example of selector switches, or more generally switches of the trunk hunting type, another feature consists in the provision of a two-step relay in each of these switches, this relay being operated to its first step when the switch has been found by the switch finder to cut off the start and marking potential and being operated in its second step when an idle trunk has been found. With the relays required for the control of both the directive setting and the trunk hunting operation of the selector concentrated in the common control relay groups, this arrangement thus results in a selector having only a single relay.

The invention, both as to its organization and method of operation, together with other objects and features thereof will best be understood by reference to the following specification taken in connection with the accompanying drawings.

In these drawings:

Fig. 1 is the circuit diagram of a selector as used in connection with the first embodiment of the invention;

Fig. 2 is the circuit diagram of a distributor used in this first embodiment;

Fig. 3 is the circuit diagram of the common apparatus used in this first embodiment, together with the single-motion selector finder provided therein.

Figures 1, 2:
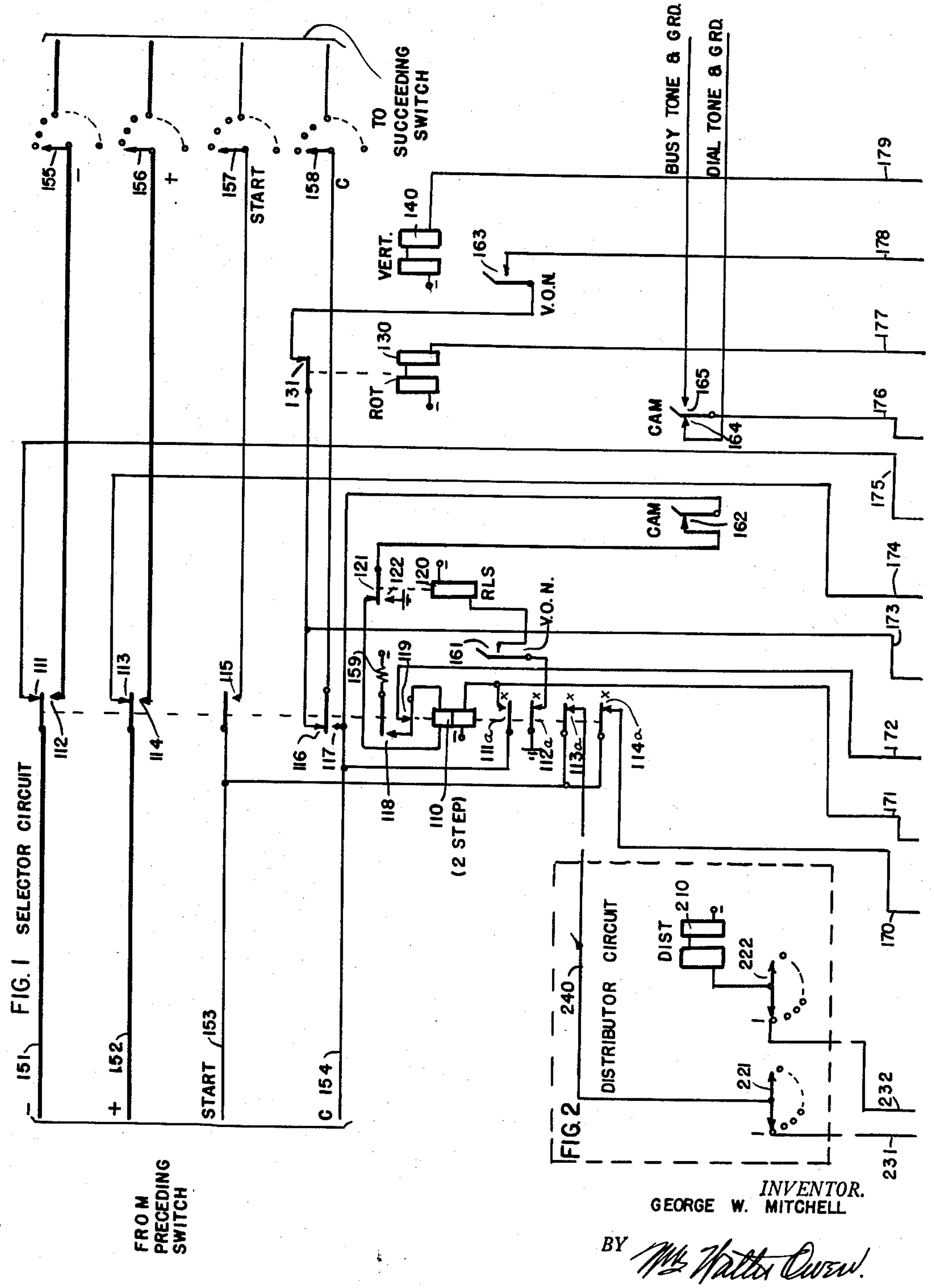
Figs. 1–3 represent an embodiment of the invention in which each common control relay group has a single-motion switch finder and Figs. 4–6 an embodiment wherein each common control relay group has a two-motion switch finder, the switches controlled by the control relay groups in both instances being assumed to be selectors. More particularly.
Figure 3:
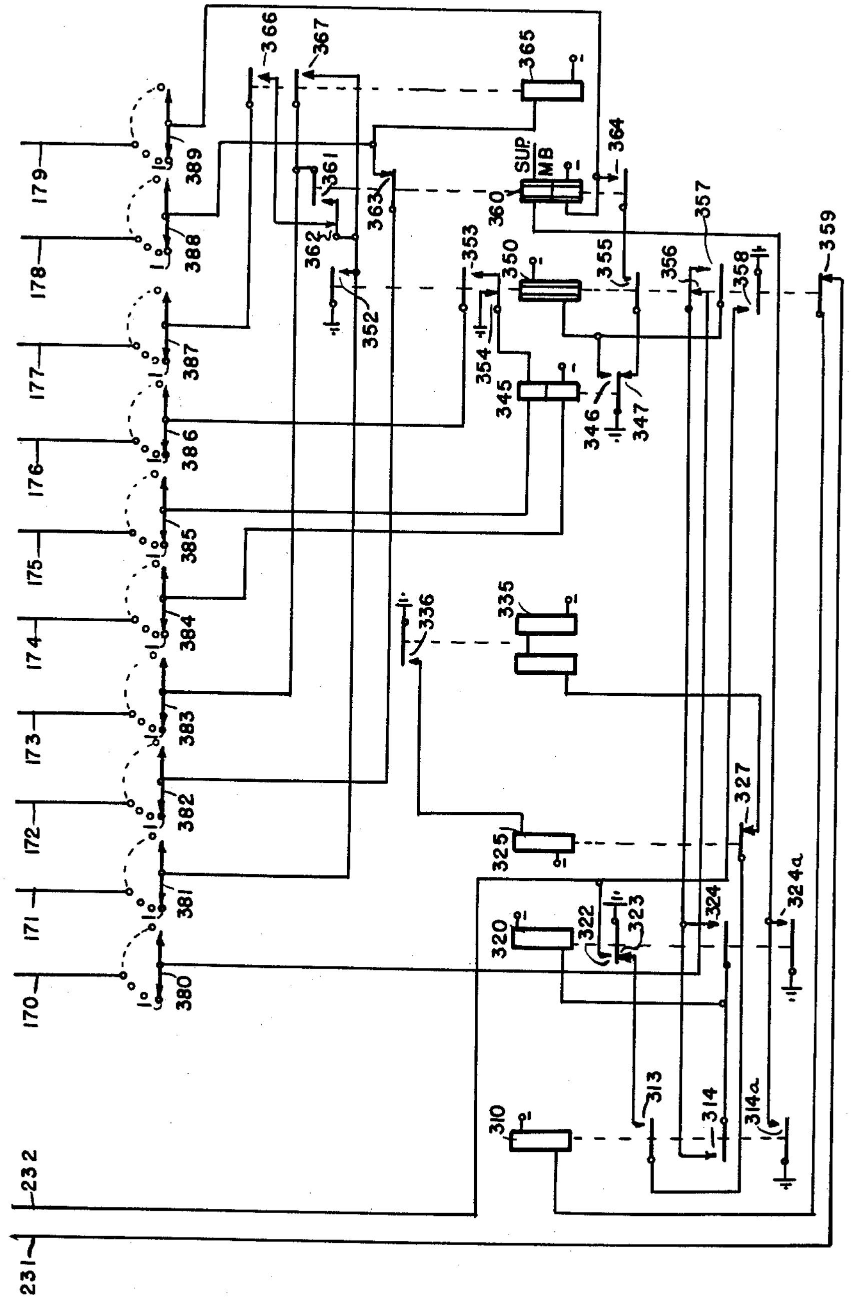
Figures 4, 5:
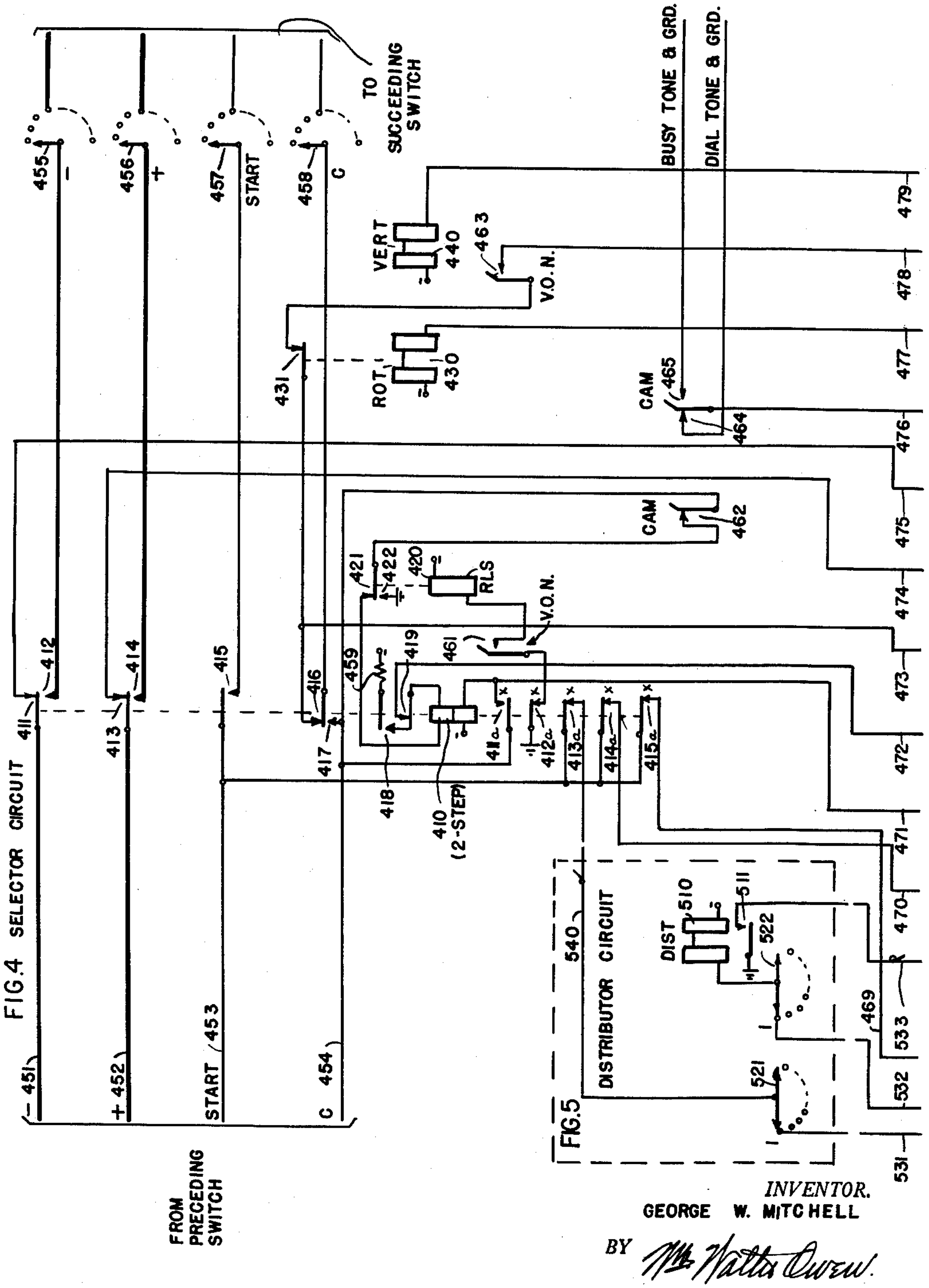
Fig. 4 is the circuit diagram of a selector as used with the second embodiment of this invention.
Fig. 5 is the circuit diagram of a distributor as used in this second embodiment.
Figure 6:
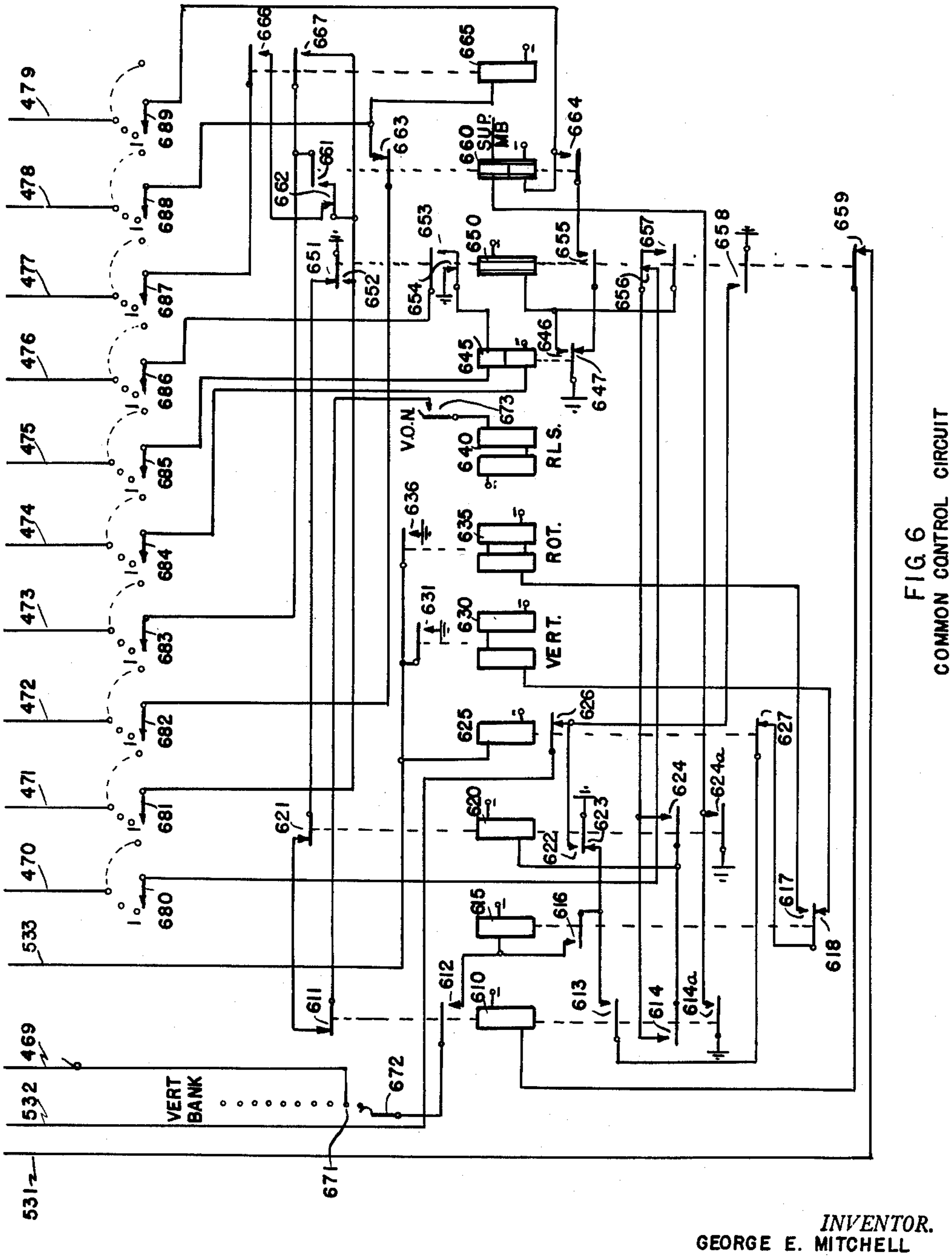
Fig. 6 is the circuit diagram of the common control apparatus used in this second embodiment together with the two-motion selector finder provided therein.

In order to form a complete common control arrangement, Fig. 3 should be placed under Figs. 1 and 2 and similarly Fig. 6 should be placed under Figs. 4 and 5.

A brief description of the apparatus employed will first be given. Referring first to the embodiment of the invention illustrated in Figs. 1–3, there is shown in Fig. 1 a selector circuit comprising a two-motion stepping switch of the Strowger type having the vertical magnet 140, the rotary magnet 130, the release magnet 120, a set of four wipers 155–158 engaging a corresponding set of contact banks, a set of vertical-off-normal contacts 161 and 163 which are actuated upon the first vertical step of the switch and a set of cam contacts 162, 164, 165 which are actuated when the switch wipers are advanced to their 11th rotary or overflow position. The aforementioned set of four wipers includes two line wipers 155 and 156, a test wiper 158 and a start wiper 157. The selector circuit also comprises a set of four incoming conductors corresponding to the four switch wipers, namely two line conductors 151 and 152, a test conductor 154 and a start conductor 153. Also included in the selector circuit is a single relay 110 which is of the two-step type, contacts 111*a*, 112*a*, 113*a*, 114*a*, all marked "*x*" being actuated when the relay is operated to its first step due to the energization of its lower winding and the remaining contacts of the relay being actuated when the relay is operated to its second step by the energization of its upper winding.

The selector shown in Fig. 1 is one of a group of selectors, for example one hundred in number, that are served in common by a small number, for instance five, of control relay groups such as that shown in Fig. 3. Individually associated with each of these control relay groups is a single-motion finder having the stepping magnet 335 and a set of wipers 380–389 and corresponding contact banks, these banks giving access to the aforementioned group of selector switches. In accordance with the assumed number of 100 selectors comprised in the group each finder bank has 100 contacts which may be arranged in two semi-circular rows of 50 contacts assuming that a pair of staggered wipers is used with each of these banks. The selector illustrated in Fig. 1 is shown connected to the 4th contact in the banks of the selector finders, namely by way of conductors 170–179. While it has been assumed above, for purposes of illustration, that five control relay groups are provided in common with the group of 100 selectors it will be understood that the ratio of control relay groups to selectors depends on traffic conditions and that in many cases a lesser number than five relay groups will suffice for the control of 100 selectors. It should also be pointed out that the group of selectors served by a group of control units such as that shown in Fig. 3, may include selectors of different rank, for example both first selectors and second selectors or second selectors and third selectors.

Associated with each selector finder and, therefore a part of each common control circuit, Fig. 3, also is a finder start relay 310, a finder interrupter relay 325, and a finder test relay 320, the last-mentioned relay operating in response to a marking potential applied to a test conductor such as 170 when the finder has found a selector which is in calling condition. Each common control circuit also comprises a line or impulse relay 345, a slow-acting hold relay 350 controlled by that line relay, a change-over relay 360 also being of the slow-releasing type, and a rotary interrupter relay 365; these last-mentioned four relays serve to control the vertical and rotary movement of the selector, Fig. 1, which happens to be connected with the common control unit, Fig. 3, by way of its finder wipers and banks.

The distributor which functions to preselect an idle control unit is shown in Fig. 2. This distributor comprises a rotary switch having the stepping magnet 210 and the wipers 221 and 222, each engaging a corresponding contact bank. As will be seen from Fig. 2, wiper 221 serves to extend the common start conductor 240 by way of a conductor such as 231 to the finder start relay such as 310 of a preselected common control circuit and wiper 222 serves to connect the distributor magnet to a conductor such as 232 over which the distributor is advanced after the finder of a control unit has found a calling selector.

The apparatus employed in the second embodiment shown in Figs. 4–6 is very similar to that used in the first embodiment of the invention except that each common control circuit, Fig. 6, according to the second embodiment has a two-motion finder. This finder is of the Strowger type having a vertical magnet 630, a rotary magnet 635, a release magnet 640, a set of wipers 680-690 and associated contact banks, each having ten contact rows or levels of ten contacts each, a vertical wiper 672 and associated vertical bank and a vertical-off-normal contact 623. It is assumed that the common control units, Fig. 6, of which five may be provided, serve a group of 100 selectors, Fig. 4, of the same or different ranks. These selectors are divided into ten subgroups of ten selectors, each subgroup being connected to one level in the banks of the finder switches. In order to direct the finder to the proper level, there is provided a separate subgroup or level test conductor such as 469 for each subgroup of ten selectors and each control unit comprises a level test relay 615 in addition to the regular test relay 620. When a selector is taken into use a marking potential is applied not only to the individual test conductor such as 470 but also to the level test conductor such as 469. Accordingly, the finder of the preselected control unit is first stepped vertically until its level test relay 615 operates when the marked subgroup or level has been found, and then rotated horizontally until its other test relay 620 operates when the individual selector in this subgroup has been found.

If it is assumed that the group of 100 selectors comprises ten selector shelves of 10 selectors each the preferred arrangement would be to have each of the abovementioned subgroups be composed of one selector from each of the ten shelves. Thus, the first subgroup or finder level may comprise the first selector of each of the ten shelves, the second subgroup or finder level the second selector of each of the ten shelves and so on.

It will be noted that for convenience in cross-reference similar parts have been given corresponding reference numerals in Figs. 1, 2, 3 and Figs. 4, 5 and 6, respectively, with the exception of the first figure of each reference numeral which denotes the figure of the drawings to which it pertains.

Having thus briefly described the apparatus employed in the two embodiments represented in the drawings, a detailed description will now be given of how these apparatus function in the setting up of a telephone call. Referring first to the selector circuit shown in Fig. 1, it will be assumed that this selector is a part of a train of switches and that it is both preceded and succeeded in this switch train by a selector circuit similar to the one shown in Fig. 1. Thus the selector shown in Fig. 1 may be a second selector and arranged to be seized by a first selector and arranged in turn to seize an idle one of a number of third selectors in a desired group, both the first and third selectors being of similar circuit design as the second selectors. The telephone system as a whole is assumed to be of the conventional type in which the switches in a switch train are held from the called end of the connection over the test conductor. In this connection and for details of the associated circuits reference is made to the above-mentioned United States Patent No. 1,514,725 to W. T. Powell.

When the selector shown in Fig. 1 is seized in a telephone call ground is connected to the incoming start conductor 153 of this selector by way of the start wiper, corresponding to wiper 157, Fig. 1, of the preceding selector, the last-mentioned selector being arranged to close ground to its start wiper upon switch-through. Ground on incoming start conductor 153 causes the operation of finder start relay 310 of the common control unit, Fig. 3, which is assumed to be the one preselected by the distributor, Fig. 2, namely by way of the following circuit: ground on start conductor 153, contact 113*a*, two-step relay 110, common start conductor 240, wiper 221 of the distributor switch, conductor 231, contact 359, relay 310, battery. Relay 310 in operating at its contact 314*a* "cocks" or pre-operates relay 360 by way of its upper winding and supervised battery; at its contact 314, relay 310 connects finder test relay 310 to finder test wiper 380 by way of contact 356; and at its contact 313 it closes the following circuit to finder magnet 335; ground, contacts 323, 313, 327, windings of magnet 335, battery. Relay 360 in operating at contact 364 closes a point in the impulsing circuit to vertical magnet 140 of the selector switch by way of wiper 389, and, in parallel thereto a holding circuit extending through the lower winding of relay 360. When finder magnet 335 operates it causes at its contact 336 the operation of finder interrupter relay 325 which at its contact 327 opens the energizing circuit of finder magnet 335. This magnet in releasing in turn opens the circuit of interrupter relay 325 and causes the finder to advance from its first to its second position. This interaction between finder magnet 335 and interrupter relay 325 continues until the finder has found the selector in calling condition. It will be noted that the selector in Fig. 1 is shown connected to the fourth contact in the contact banks of the selector finder, Fig. 3. Thus after this finder has taken its third step the following circuit is closed for finder test relay 320; ground on incoming start conductor 153, contact 114*a* of two-step relay 110, conductor 170, wiper 380 of the finder in its fourth position, contacts 356 and 314, winding of relay 320, battery.

Relay 320 upon operating at its contact 324 locks to the marking potential, i. e. ground, on start conductor 153 independently of contact 314 of start relay 310; at 324*a*, relay 320 closes a multiple ground to the upper winding of relay 360; at 323 relay 320 disconnects ground from the circuit of finder magnet 335 thereby preventing the reoperation of this magnet; and at 322 the relay energizes distributor magnet 310 in the following circuit: ground, contact 322, conductor 232, bank contact and wiper 222 of the distrubutor in position 1, windings of stepping magnet 210 of the distributor switch, battery.

With the wipers of the selector finder now standing in their fourth position a circuit is closed to the common line or impulse relay 345 which may be traced from the calling loop by way of the line wipers, not shown, of the preceding selector, conductors 151 and 152, contacts 111 and 113, conductors 175 and 174, wipers 385 and 384 in their fourth position, upper and lower windings of relay 345 to ground, namely, by way of contact 354, and battery, respectively. Relay 345 in operating at contact 346 causes the operation of slow-release relay 350 over an obvious circuit. This last-mentioned relay operates, at its contacts 353, 354, transfers the upper winding of line relay 345 from direct ground to dial tone and ground, namely by way of wiper 386 in its fourth position, conductor 176 and selector overflow contact 164; at its contact 352 it closes a circuit to the lower winding of relay 110 of this selector, Fig. 1, in a circuit which may be traced from ground through contact 352, finder wiper 381 in position 4, conductor 171, and lower winding of relay 110 to battery; at contact 355, relay 350 closes another point in the vertical impulsing circuit; at contacts 356, 357, relay 350 transfers the winding of finder test relay 320 from marking ground on conductor 170 to ground at contact 346 of line relay 345; at 358 relay 350 closes a multiple ground to conductor 232, and at contact 359 it opens the circuit of start relay 310, the release of this last-mentioned relay, however, being of no consequence at this time as test relay 320 is operated.

When two-step relay 110 in the selector is energized over its lower winding as just described it operates in its first step, thereby actuating its first-step contacts 111*a*, 112*a*, 113*a* and 114*a*, each of these contacts accordingly being marked "*x*" in Fig. 1. At its contact 111*a*, relay 110 extends ground on conductor 171 to incoming test conductor 154, thereby holding the switching relay, not shown, of the preceding first selector operated as will appear more clearly from the description given below of the switch-through operation of the present selector, Fig. 1; at its contact 112*a* it closes a point in the circuit of release magnet 120 of the selector switch; at contact 113*a* it disconnects ground on conductor 153 from common start conductor 240; and at contact 114*a* relay 110 disconnects ground on conductor 153 from conductor 170, thereby removing the marking which characterizes the selector, Fig. 1, as being in calling condition. This prevents another common control unit which may be started in a subsequent call to connect itself with the particular selector shown in Fig. 1.

As mentioned above distributor magnet 210 was energized upon the energization of finder test relay 320. Assuming that the distributor switch is of the direct stepping type, it will, upon energization of its magnet, advance its wipers from its position 1 in which it is shown to position 2. Accordingly, the circuit of distributor magnet 210 is opened at wiper 222 as this wiper disengages its first bank contact, and magnet 210, therefore, is deenergized; when wiper 221 disengages its first bank contact another point is opened in the circuit of finder start relay 310. As mentioned above ground is connected to conductor 232 at contact 322 of finder test relay 320 and also at contact 358 of slow-to-release relay 350 which latter relay remains operated until the control unit, Fig. 3, is released upon switch-through of the selector, Fig. 1, as will be described in greater detail below. As a result ground is connected to conductors corresponding to conductor 232 in all control units that are at any given time effectively associated with a selector. Thus wiper 222 of the distributor switch will encounter ground on all bank contacts leading to such control units and each time distributor magnet 210 will be energized from such a ground until wiper 222 opens the magnet circuit by disengaging the bank contact in question. In this manner the distributor switch is automatically stepped over all positions corresponding to busy control circuits and the wipers of this switch will only come to rest when an idle control unit, that is one not engaged in the control of a selector, is found. At wiper 221 the common start conductor 240 is then switched to the finder start relay of the control unit which has thus been preselected.

As mentioned above when the control unit, Fig. 3, was effectively connected to the selector, Fig. 1, by way of the finder wipers and banks, the upper winding of relay 345 of this unit was switched from direct ground to dial tone and ground so that the calling party now receives dial tone by way of the following circuit: dial tone and ground, overflow contact 164 of the selector, conductor 176, wiper 386, contact 353, upper winding of relay 345, wiper 385, conductor 175, contact 111, negative line conductor 151 and from there by way of the preceding switches to the telephone instrument, not shown, of the calling party. Upon hearing the dial tone, the calling subscriber dials the digit required for directively setting the selector, Fig. 1, this digit in the instant case being the second digit dialled as the selector, Fig. 1, has been assumed to be a second selector. Upon the first interruption of the calling loop in this series of impulses, line relay 345 releases thereby opening the circuit of relays 350 and 320. As relay 350 is of the slow-releasing type it will remain operated throughout the impulse series. However, relay 320 restores, thereby opening another point in its own circuit at contact 324 to prevent its reoperation; removing a multiple ground from conductor 232 at contact 323; and opening the circuit through the upper winding of relay 360 at contact 324*a*, thereby permitting this relay to release at the end of the digit. Also upon the first release of relay 345, the following circuit is closed for vertical magnet 140 of the selector, Fig. 1, and the lower winding of relay 360, Fig. 3, in parallel: ground, contacts 347, 355, 364, wiper 389, conductor 129, and from there through the windings of vertical magnet 140 to battery and in multiple therewith through the lower winding of relay 360 to battery. Upon its energization vertical magnet 140 raises the wiper shaft of the selector switch one step so that vertical-off-normal contacts 161, 162 and 163 are actuated. Upon the closure of vertical-off-normal contact 163, interrupter relay 365 is operated in a circuit which may be traced from ground through contacts 352 and 361, wiper 383, conductor 173, rotary interrupter contact 131, contact 163, conductor 178, wiper 388, winding of relay 365, battery. Relay 365 in operating at contact 366 closes a point in the circuit for rotary magnet 130 which, however, is incomplete at this time; and at 367 closes a locking circuit for itself which is independent of contact 361 of relay 360. When line relay 345 operates at the end of the first impulse of the series the above-traced circuit over vertical magnet 140 is opened at contact 347 so that magnet 140 is deenergized. Due to its slow-release characteristic relay 360 remains operated throughout the digit in spite of the momentary interruptions of the circuit through its lower winding at contact 347.

At the end of the impulse series when the wiper shaft has raised the wipers of the selector switch a number of steps corresponding to the number of impulses contained in the dialled digit, relay 360 releases due to the circuit through its lower winding remaining permanently open at contact 347 of line relay 345. Upon releasing relay 360 at its contact 362 completes the following circuit to rotary magnet 130 of the selector, Fig. 1: ground, contacts 352, 362 and 366, wiper 387, conductor 177, windings of rotary magnet 130, battery. The rotary magnet in operating at its interrupter contact 131 opens the above-mentioned locking circut of relay 365 thereby causing this relay to release. Also upon operating the rotary magnet causes the wipers of the selector switch to be brought into engagement with the first set of bank contacts in the selected level. When relay 365 releases it opens the circuit of rotary magnet 130 at contact 366 so that this magnet is deenergized and rotary interrupter contact 131 recloses.

The subsequent operation of the circuit will depend on whether the trunk encountered by C-wiper 158 of the selector in the first rotary position of the selected level is busy or idle. Assuming first that this trunk is busy ground will be connected to the test conductor in the succeeding switch so that relay 365 re-operates in a circuit which may be traced from the aforementioned ground by way of wiper 158, contacts 116, 131 and 163, conductor 178, wiper 388 and the winding of relay 365 to battery. Relay 365 in reoperating at its contact 367 closes the following locking circuit for itself which is independent of the ground returned by way of wiper 158: ground, contacts 352 and 367, wiper 383, conductor 173, contacts 131 and 163, conductor 178, wiper 388, winding of relay 365, battery. Relay 110 of the selector cannot be energized at this time over its upper or switching winding since ground is connected to both terminals of this winding under the present condition. The two ground connections to the upper winding of relay 110 may be traced as follows: ground, contact 352, wiper 381, conductor 171, contacts 111*a*, 162 and 121 on the one hand and ground on wiper 158 through contact 116, or alternatively ground at contact 352 through contact 367, wiper 383, conductor 173, and from there through contacts 131, 163, conductor 178, wiper 388, contact 363, wiper 382, conductor 172, contact 119 on the other hand. At contacts 366 relay 365 re-closes the above-traced circuit for rotary magnet 130. As a consequence magnet 130 again opens the locking circuit of relay 365 to cause the release of this relay and advances the wipers of the selector switch from the first to the second rotary position in the selected level.

This interaction between rotary magnet 130 of the selector and interrupter relay 365 of the control unit will continue until an idle trunk in this level is found. If such an idle trunk has been found no ground potential will be encountered by C-wiper 158 of the selector switch so that direct ground cannot be re-connected to the winding of relay 365 to operate this relay. Also as a result of this the upper winding of two-step relay 110 in the selector is no longer short-circuited so that this winding can now be energized in series with relay 365 in the following circuit: ground, contact 352, wiper 381, conductor 171, contacts 111*a*, 162, and 121, upper winding of relay 110, contact 119, conductor 172, wiper 382, contact 363, winding of relay 365, battery. When thus energized in series with the upper winding of relay 110 which is of relatively high resistance, relay 365 cannot operate but relay 110 is operated to its second step. When relay 110 is thus fully operated it actuates all of its remaining contacts: at contacts 118, 119 the relay transfers its upper winding from battery through the winding of relay 365 to local battery through resistance 159; at contact 116 the relay disconnects C-wiper 158 of the selector from the circuit of interrupter relay 365 and switches this wiper through to incoming test conductor 154; at contacts 111 and 113 the relay switches incoming line conductors 151, 152 from the windings of common line relay 345 to line wipers 155 and 156, respectively, of the selector; and at contact 115 the relay switches the start conductor through to start wiper 157.

Start ground is now connected by way of the wiper and bank contact of the preceding switch, start conductor 153, contact 115, wiper 157, and bank contact engaged thereby to the incoming start conductor of the succeeding switch which according to the assumption made above is a third selector and of a design similar to that of the second selector, Fig. 1. Consequently an idle control unit which may or may not belong to the same group as the control unit shown in Fig. 3 is caused to connect itself by way of its finder to the seized third selector in the manner explained above in connection with the second selector, Fig. 1. As soon as the last-mentioned finder has found the third selector in calling condition the line relay of the associated control relay group, corresponding to relay 345 of the control unit, Fig. 3, is operated from the calling loop by way of line conductors 151, 152, switching contacts 110, 114, line wipers 155, 156, all in Fig. 1, and further by way of the line conductors in the third selector and the bank contacts and wipers of the last-mentioned finder. Accordingly, the slow-release relay corresponding to relay 350, Fig. 3 is operated in the control unit associated with the third selector seized and this relay causes ground to be connected to the incoming test conductor of that selector by way of a contact corresponding to contact 111*a* in Fig. 1. This ground, in turn, causes relay 110 of the second selector, Fig. 1, to be held in a circuit extending over the incoming test conductor of the third selector, C-bank contact and wiper 158 of the second selector, Fig. 1, contacts 117, 162, 121, upper winding of relay 110, contact 118, resistance 159 to battery. The aforementioned ground on test wiper 158 is also extended by way of contact 117 to incoming test conductor 154, of the second selector, Fig. 1, and from there back over the test bank contact and wiper of the first selector to the switching relay, corresponding to relay 110, of this last-mentioned selector, and to the hold relays of other preceding switches such as a line switch that may have been employed in the setting up of the connection.

It will be noted that the holding circuit for all of these switches is independent at this time from any ground extended through the finder wipers of the control unit, Fig. 3, which returns to normal as described below. It will also be understood that when the third selector, after receipt of the third digit dialled in turn switches through to an idle trunk in the selected group, the above-mentioned holding ground from the control unit effectively associated with that third selector is replaced by ground returned from that trunk.

As mentioned above when relay 110 in the selector, Fig. 1, operates it disconnects the windings of common line relay 345, Fig. 3, at contacts 111 and 113, thereby causing this last-mentioned relay to restore. By opening its contact 346, relay 345 in turn causes the release of slow-acting relay 350. This latter relay in restoring at its contact 352 removes ground from wiper 381 and conductor 171 so that relay 110 and the hold relays connected to the test conductor in the preceding switches are now exclusively held from ground returned from the succeeding switches by way of test wiper 158. At contact 359, relay 350 reconnects finder start relay 310 to conductor 231 and at contact 358 the relay removes ground from guard conductor 232. The common control unit, Fig. 3, has thus returned to normal condition and since conductor 232 is no longer grounded, this unit is again available to the distributor, Fig. 2, for pre-selection.

At the called end the connection may be completed by a connector or some other suitable circuit to a called subscriber or an operator in any conventional manner. At the end of the conversation when the calling party or both the calling and called parties have disconnected, ground is removed from the test conductor at the called end of the connection such as in a connector switch in a manner well known in the art, and as a result relay 110, Fig. 1, and the other hold relays connected to the test conductor restore. With relay 110 released the following circuit is closed to selector release magnet 120: ground, contacts 112*a* and 161, winding of magnet 120, battery. Release magnet 120 accordingly operates and restores the switch mechanism to normal in a well-known manner. While magnet 120 is energized another point in the circuit of the upper winding of relay 110 is held open at 121 and ground is connected to incoming test conductor 154 at 122 to keep the selector, Fig. 1, guarded during release. When the switch shaft has returned to its normal position vertical-off-normal contact 161 opens, thereby re-opening the circuit of release magnet 120 and causing this magnet to restore. The selector circuit, Fig. 1, is now back in its normal condition.

It was assumed above that the selector, Fig. 1, after being set on a desired level found an idle trunk in this level with the aid of the common control circuit, Fig. 3. On the other hand, if there is no idle trunk in the level selected, the interaction between interrupter relay 365 and rotary magnet 130 continues until the switch has been stepped to its 11th rotary position. As ground is no longer encountered in this position by test wiper 158 the rotary motion of the switch will be stopped. Moreover, at overflow or cam contact 162 the circuit extending through the upper winding of relay 110 and the winding of relay 365 in series is opened so that relay 110 cannot be operated to its second step. At overflow or cam contact 165 the following busy tone circuit is closed: busy tone and ground, contact 165, conductor 176, wiper 386, contact 353, upper winding of line relay 345, wiper 385, conductor 175, contact 111, negative line conductor 151, and from there by way of the preceding switches to the instrument of the calling party. Upon hearing the busy tone the calling subscriber replaces his receiver so that line relay 345 releases in turn releasing slow-acting relay 350. This places the common control unit, Fig. 3, back into its normal condition. At contact 352 of relay 350 ground is removed from conductor 171 so that relay 110, Fig. 1, releases and the other relays connected to the test conductor in the preceding switches are also restored. At contact 112*a*, relay 110 closes the circuit for release magnet 120 of the selector switch and when the selector switch mechanism upon the operation of this magnet has returned to normal the circuit of relay 120 is re-opened at vertical-off-normal contact 161 at which time the selector circuit, Fig. 1, has also returned to its normal condition.

As mentioned above the embodiment of the invention shown in Figures 4 to 6 of the drawings is similar to that shown in Figures 1 to 3 except that the selector finder associated with the common control unit, Fig. 6, is of the two-motion Strowger type having a vertical wiper 672 and an associated vertical contact bank. As the operation of this second embodiment in all other respects is similar to that of the embodiment according to Figures 1 to 3, the description of the second embodiment can be limited to a brief explanation of how the selector finder, Fig. 6, is controlled to find the selector, Fig. 4, which is in calling condition and how the finder's switch is released upon switch-through of the selector.

When the selector, Fig. 4, is seized by the preceding switch ground on start conductor 453 causes the operation of finder start relay 610 by way of contact 413*a*, common start conductor 540, wiper 521 and associated first bank contact of the distributor, Fig. 5, conductor 531, and contacts 659. Relay 610 in operating at contact 612 closes the vertical wiper 672 to the winding of level test relay 615; at contact 614 closes the winding of test relay 620 by way of contact 656 to finder test wiper 680; at contact 614*a* pre-operates change-over relay 660 in an obvious circuit extending over its upper winding; at contact 611 opens a point in the circuit of release magnet 640 of the finder switch; and at contact 613 closes the following circuit to vertical magnet 630 of this switch: ground, contacts 623, 613, 627, 618, windings of vertical magnet 630, battery. Vertical magnet 630 upon operating raises the wiper shaft of the finder switch one step and actuates its contact 631 so that finder interrupter relay 625 operates, opening the circuit of vertical magnet 630 at contact 627 and accordingly causing the vertical magnet to be deenergized.

It is assumed in the drawings that the selector shown in Fig. 4 is connected to the third bank contact in the first level of the selector finders. Therefore, after the switch has completed its first vertical step the following circuit to level test relay 615 is closed: ground on start conductor 453, contact 415*a*, level marking conductor 469, first contact 671 in the vertical bank and vertical wiper 672 of the finder switch, contact 612, winding of relay 615, battery. Relay 615 in operating at contact 616 closes a locking circuit for itself extending to ground at contact 623 whereby this relay is maintained in operated condition after the vertical wiper disengages the vertical bank upon the first rotary step of the finder switch; and at contacts 618, 617 the relay switches the operating ground at contact 623 from the windings of vertical magnet 630 to those of rotary magnet 635 so that this last-mentioned magnet is energized and the deenergization of vertical magnet 630 prevented. Rotary magnet 635 upon operating rotates the wiper shaft of the finder switch one step whereby wipers 680—689 of this switch are brought into engagement with their respective first bank contacts. At its contact 636, rotary magnet 635 causes the operation of stepping relay 625 which at 627 opens the circuit of rotary magnet 635 thereby deenergizing this magnet. Accordingly the circuit of stepping relay 625 is opened at contact 636 and this relay in releasing re-closes the circuit of magnet 635 at contact 627. This interaction between rotary magnet 635 and interrupter relay 625 continues until the finder switch has reached its third rotary position in which the following circuit is closed for test relay 620: ground at start conductor 453, contact 414*a*, conductor 470, wiper 680, contacts 656 and 614, winding of relay 620, battery.

Relay 620 in operating at its contact 623 causes the release of level test relay 615 and disconnects ground from the circuit of rotary magnet 635 to prevent the re-operation of this magnet; at contact 622 closes a multiple circuit to the upper winding of change-over relay 660; at contact 622 relay 620 causes the energization of distributor magnet 510 in a circuit extending over contact 626, conductor 532, first bank contact and wiper 522 of the distributor switch, windings of distributor magnet 510, battery; and at contact 624 the relay causes a locking circuit for itself independently of start relay 610.

With the wipers of the selector finder now standing in the first vertical and third rotary position of the switch which gives access to the selector, Fig. 4, the calling loop is extended by way of wipers 684 and 685 of the finder switch to the two windings, respectively, of line relay 645 so that this relay operates, in turn causing the operation of slow-release relay 650. This last-mentioned relay at its contact 652 causes the operation by way of wiper 681 and conductor 471 of two-step relay 410 in its first step; at its contact 653 closes dial tone ground to the negative side of the line; at contact 659 causes the release of start relay 610; at contacts 657, 656 transfers the winding of finder start relay 620 from marking ground to ground at contact 646 of line 645; and at contact 658 closes multiple ground to guard conductor 532.

Relay 410 in operating in its first step at contact 411*a* extends ground on conductor 471 to incoming test conductor 454 to hold the preceding switches; at contact 413*a* disconnects ground on start conductor 453 from common start conductor 540; at 414*a* disconnects the start ground from the individual marking conductor 470 and at 415*a* from level marking conductor 469.

As mentioned above, distributor magnet 510 is energized over guard conductor 532 upon the energization of finder test relay 620 and in operating at its contact 511 causes the operation of finder stepping relay 625 which at its contact 626 interrupts the circuit of the distributor magnet. The distributor magnet in releasing causes the wipers of the distributor switch to be stepped from position 1 to position 2 and at 511 also opens the circuit of stepping relay 625, thereby permitting this relay to restore. If the common control unit connected to bank contact 2 of the distributor is idle the distributor will come to rest in this position but if this other control unit happens to be also busy the distributor magnet is re-energized from ground at the guard conductor, corresponding to conductor 532 of this last-mentioned unit. As a result magnet 510 at its contact 511 operates the stepping relay, corresponding to relay 625, of this other unit which relay in turn interrupts the energizing circuit of magnet 510. In this manner the distributor is automatically stepped ahead until its wipers come to a rest on the bank contacts corresponding to the first idle control unit encountered.

When the calling subscriber hears the dial tone he proceeds with the dialling of the digit intended to directively set the selector, Fig. 4. Upon the first opening of contact 646 in response to the first impulse of the series the locking circuit of finder start relay 620 is opened. This relay at its contact 622 opens the circuit of the upper winding of change-over relay 660 since start relay 610 is released.

From here on the operation of the embodiment shown in Figures 4, 5 and 6 corresponds to that described in connection with the first embodiment disclosed herein. However, while the rotary finder shown in Fig. 3 upon release of the common control unit responsive to the switch-through operation of the selector remains in the position assumed thereby in originally connecting with this selector the finder switch shown in Fig. 6, being of the Strowger type, is restored to normal upon switch-through of the associated selector, Fig. 4. More specifically, when relays 645 and 650 restore subsequent to the operation of relay 410 to its second step the following circuit for release magnet 640 of the finder switch is closed: ground, break contact 651 of relay 650, contacts 621, 611 and 673, windings of release magnet 640, battery. The finder switch mechanism is therefore restored to normal in a well known manner and after the wiper shaft of the switch has reached its normal position vertical off-normal contact 673 opens the energizing circuit of release magnet 640 so that this magnet restores. At this time the common control unit, Fig. 6 has returned to its normal condition.

While particular embodiments have been illustrated and described, it is to be understood that numerous modifications in the details of arrangement may be resorted to without departing from the true spirit and scope of the invention as described in the appended claims.

What is claimed is:

1. In a telephone system, a plurality of numerical switches of the trunk hunting type each having magnet means, a plurality of control apparatus associated in common with said switches, each including a finder providing access to said switches, means for allotting a predetermined one out of a number of idle control apparatus, a start circuit effective upon one of said switches being taken into use to cause the finder of a control apparatus allotted by said last-mentioned means to be started in search for the switch taken into use, said common control apparatus including relay means operative in response to said switch being found by said finder for causing said allotter means to disassociate itself from said control apparatus, and said switch including relay means operative in response to said switch being found by said finder for rendering said start circuit ineffective, two impulsing circuits governing the directive and trunk hunting movements respectively of said switch and each including said magnet means and extending from said control apparatus to said switch by way of said finder, and said control apparatus further including means responsive to the receipt of numerical impulses for controlling said first impulsing circuit and responsive to the termination of said first impulsing operation for controlling said second impulsing circuit.

2. In a telephone system, a plurality of trunk hunting switches, a plurality of control relay groups associated in common with said switches to control their trunk hunting operation, each having individually associated therewith a finder providing access to said switches and each including an interrupter relay for controlling the trunk hunting operation of said switches, allotter means for preselecting an idle control relay group, a start circuit effective upon one of said switches being taken into use to cause the finder of a control relay group preselected by said last-mentioned means to be started in search for the switch taken into use, said switch including relay means responsive to said switch being found by said finder for rendering said start circuit ineffective, said control relay group including relay means responsive to said switch being found by said finder for causing said allotting means to disassociate itself from said control relay group, and said interrupter relay being responsive to a busy potential returned by way of said switch and said finder from a busy trunk encountered by said switch to cause said switch to be advanced to the next following trunk.

3. In a telephone system, a plurality of trunk hunting switches, a plurality of control relay groups associated in common with said switches to control their trunk hunting operation, each having individually associated therewith a finder providing access to said switches and each including an interrupter relay for controlling the trunk hunting operation of said switches, a rotary distributor switch, having a set of wipers and a set of contact rows over which said control relay groups are accessible, for preselecting an idle control relay group, a start circuit effective upon one of said switches being taken into use to cause the finder of the control relay group preselected by said distributor switch to be started in search for the switch taken into use, said switch including relay means responsive to said switch being found by said finder for rendering said start circuit ineffective, said control relay group including relay means responsive to said switch being found by said finder for causing said distributor switch to advance its wipers and preselect another idle control relay group, and said interrupter relay being responsive to a busy potential returned, by way of said switch and said finder, from a busy trunk encountered by said switch to cause said switch to be positioned on the next following trunk.

4. In a telephone system, a plurality of numerical switches of the trunk hunting type each having magnet means, a plurality of control apparatus associated in common with said switches, each including a finder providing access to said switches, means effective upon one of said switches being taken into use to close a start circuit and mark said switch to said finder as being in calling condition, means for allotting a predetermined one out of a number of idle control apparatus, means responsive to the closure of said start circuit for causing the finder of the control apparatus allotted by said allotting means to search for the marked switch, said switch including relay means operative in response to said marked switch being found by said finder for opening said start circuit and removing said marking, and said control apparatus including relay means operative in response to said marked switch being found by said finder for causing said allotting means to dissociate itself from said control apparatus, two impulsing circuits governing the directive and trunk hunting movements respectively of said switch and each including said magnet means and extending from said control apparatus to said switch by way of said finder, and said control apparatus further including means responsive to the receipt of numerical impulses for controlling said first impulsing circuit and responsive to the termination of said first impulsing operation for controlling said second impulsing circuit.

5. In a telephone system, a plurality of numerical switches each having magnet means and cut-off relay means, a plurality of control relay groups associated in common with said switches, each having individually associated therewith a finder providing access to said switches and each including a line relay for controlling the directive setting of said switches and a slow-acting relay controlled by said line relay, a start circuit effective upon one of said switches being taken into use in a telephone call to cause the finder of an idle control relay group to be started in search for said switch, said slow-acting relay being responsive to the operation of said line relay upon said switch being found by said finder for operating said cut-off relay means by way of said finder to render said start circuit ineffective and guard said switch against seizure in another call and an impulsing circuit including said magnet means and extending from said relay group to said switch by way of said finder, said line relay being responsive to the receipt of numerical impulses for intermittently closing said impulsing circuit.

6. In a telephone system, a plurality of numerical switches each having magnet means and cut-off relay means, a plurality of control relay groups associated in common with said switches, each having individually associated therewith a finder providing access to said switches and each including a finder test relay, a line relay for controlling the directive setting of said switches and a slow-acting relay controlled by said line relay, means effective upon one of said switches being taken into use in a telephone call to close a start circuit and mark said switch to said finder as being in calling condition, means for allotting a predetermined one out of a number of idle control relay groups, means responsive to the closure of said start circuit for causing the finder of the allotted control relay group to search for the marked switch, said finder test relay being responsive to the marked switch being found by said finder for causing said allotting means to disassociate itself from said control relay group and stopping said finder on the switch in calling condition, and said slow-acting relay being responsive to the operation of said line relay upon said control switch being found by said finder for operating said cut-off relay means by way of said finder to render said start circuit ineffective and an impulsing circuit including said magnet means and extendng from said relay group to said switch by way of said finder, said line relay being responsive to the receipt of numerical impulses for intermittently closing said impulsing circuit.

7. In a telephone system, a calling line, a plurality of trunk hunting switches each having first and second relay means, a plurality of control apparatus associated in common with said switches to control their trunk hunting operation and each including a finder providing access to said switches, means effective upon one of said switches being taken into use in a telephone call from said line to close a start circuit and mark said switch to said finder as being in calling condition, and means responsive to the closure of said start circuit for causing the finder of an idle control apparatus to search for the marked switch, said first relay means being responsive to the marked switch being found by said finder for opening said start circuit and removing said marking, and said second relay means being responsive to an idle trunk having been found to switch said calling line through to said trunk.

8. In a telephone system, a calling line, a plurality of trunk hunting switches, each having first and second relay means, a plurality of control apparatus associated in common with said switches to control their trunk hunting operation and each including a finder providing access to said switches, means effective upon one of said switches being taken into use in a telephone call from said line to close a start circuit and mark said switch to said finders as being in calling condition, means for allotting a predetermined one of a number of idle control apparatus, and means responsive to the closure of said start circuit for causing the finder of the control apparatus allotted by said allotting means to search for the marked switch, said control apparatus including means responsive to said marked switch being found by said finder for causing said allotting means to disassociate itself from said control apparatus, said first relay means being responsive to the marked switch being found by said finder for opening said start circuit and removing said marking, and said second relay means being responsive to an idle trunk having been found to switch said calling line through to said trunk and cause said control apparatus to be rendered available again to said allotting means.

9. In a telephone system, a plurality of selectors each having a single relay, this relay being of the two-step type, a plurality of control apparatus associated in common with said selectors to control their directive setting and their trunk hunting operation and each including a finder providing access to said selectors, means effective upon one of said selectors being taken for use in a telephone call to close a start circuit and mark said selector to said finder as being in calling condition, means responsive to the closure of said start circuit for causing the finder of an idle control aparatus to search for the marked selector, said control apparatus including means controlling said two-step relay by way of said finder said relay being operated under the control of the last-mentioned means to its first step responsive to said marked selector being found by said finder for opening said start circuit and removing said marking, and being operated under the control of the last-mentioned means to its second step responsive to an idle trunk having been found to switch said selector through to said trunk.

10. In a telephone system, a plurality of selectors each having a single relay, this relay being of the two-step type, a plurality of control apparatus associated in common with said selectors to control their directive setting and their trunk hunting operation and each including a finder providing access to said selectors, means effective upon one of said selectors being taken into use in a telephone call to close a start circuit and mark said selector to said finders as being in calling condition, means for allotting a predetermined one of a number of idle control apparatus, and means responsive to the closure of said start circuit for causing the finder of the control apparatus allotted by said allotting means to search for the marked selector, said control apparatus including means responsive to said marked switch being found by said finder for causing said allotting means to disassociate itself from said control apparatus, and further including means controlling said two-step relay by way of said finder said relay being operated under the control of the last-mentioned means to its first step responsive to said marked selector being found by said finder for opening said start circuit and removing said marking, and being operated under the control of the last-mentioned means to its second step responsive to an idle trunk having been found to switch said selector through to said trunk and cause said control apparatus to be rendered available again to said allotting means.

11. In a telephone system, a switch train including a selector switch being one of a group of such switches, each having an incoming start conductor, a plurality of control apparatus associated in common with the selector switches of said group to control their directive setting and trunk hunting operation and each including a finder providing access to the switches of said group, a switch preceding said selector switch in said train and having a set of wipers and associated contact banks, means in said preceding switch effective when said selector switch is taken into use to apply a start potential to said conductor by way of one of said wipers and bank contacts for causing the finder of an idle control apparatus to search for the selector switch taken into use and relay means in said selector switch responsive to said selector switch being found by said finder for disconnecting said start potential.

12. In a telephone system, a switch train including a selector switch being one of a group of such switches each having an incoming start conductor and each switch of said train having a set of talking and test wipers and associated bank contacts, a plurality of control apparatus associated in common with the selector switches of said group to control their directive setting and their trunk hunting operation and each including a finder providing access to the switches of said group, a switch preceding said selector switch in said train and having, in addition to said set of talking and test wipers and contact banks, a separate start wiper and contact bank, means in said preceding switch effective when said selector switch is taken into use to apply a start potential to said conductor by way of said start wiper and bank for causing the finder of an idle control apparatus to search for the selector switch taken into use, said selector switch including relay means responsive to said selector switch being found by said finder for disconnecting said start potential and relay means operative when an idle trunk has been found for holding said switch in a circuit extending from the called end over the test wiper of said switch.

13. In a telephone system, a switch train including a selector switch being one of a group of such switches, each having an incoming start conductor, a plurality of control apparatus associated in common with the selector switches of said group to control their directive setting and trunk hunting operation and each including a finder providing access to the switches of said group, means in a switch preceding said selector switch effective when said last-mentioned switch is taken into use to apply a start and marking potential to said conductor, a common start circuit closed by the application of said potential to said conductor for causing a finder of an idle control apparatus to start a searching movement, a finder test circuit including said potential and conductor and closed upon said selector switch having been found by said finder, means responsive to the closure of said test circuit to stop said finder and cause said control apparatus to be connected with said switch by way of said finder, and relay means in said selector switch responsive to said connection for disconnecting said potential from both said start and test circuits.

14. In a telephone system, a switch train including a selector switch being one of a group of such switches, each having a set of wipers and incoming conductors including talking and test wipers and conductors and including a separate start conductor, a plurality of control apparatus associated in common with the selector switches of said group to control their directive setting and their trunk hunting operation and each including a finder providing access to the switches of said group, means in a switch preceding said selector switch effective when said last-mentioned switch is taken into use to apply a start and marking potential to said start conductor, a start circuit closed by the application of said potential to said start conductor for causing a finder of an idle control apparatus to start a searching movement, a finder test circuit including said potential and start conductor and closed upon said selector switch having been found by said finder, means responsive to the closure of said test circuit to stop said finder and cause said control apparatus to be connected with said switch by way of said finder, said selector switch including means responsive to such connection for disconnecting said potential from both said start and test circuits and means operative when an idle trunk has been found for holding said switch in a circuit extending from the called end over the test wipers of said switch.

15. In a telephone system, a switch train including a selector switch being one of a group of such switches, each having an incoming start conductor, a plurality of control apparatus associated in common with the selector switches of said group to control their directive setting and their trunk hunting operation and each including a finder providing access to the switches of said group, allotting means for preselecting an idle control apparatus, a switch preceding said selector switch in said train and having a set of wipers and associated contact banks, means in said preceding switch effective when said selector switch is taken into use to apply a start potential to said conductor, means in said preselected control apparatus operated from said start potential by way of said conductor and said allotting means to cause the finder of said apparatus to search for the selector switch taken into use and relay means in said selector switch responsive to said selector switch having been found by said finder for disconnecting said start potential.

16. In a telephone system, a plurality of numerical switches of the two-motion type and a control relay group associated in common with said switches, said relay group having associated therewith a finder for effectively connecting said relay group with a switch in calling condition and including a finder test relay, a line relay for directively controlling the primary motion of said switch, and a change-over relay for switching the control of said switch from primary to secondary motion, a test circuit including said test relay and an impulsing circuit including said line relay, both said circuits extending by way of said finder, said finder test relay being operated over said test circuit in response to the switch in calling condition being found by said finder to stop said finder on said switch, said line relay being operated over said impulsing circuit in response to its connection with the switch in calling condition to actuate a contact, a locking circuit for said test relay including said contact, and a circuit controlled by said test relay for pre-operating said change-over relay whereby said test relay releases upon receipt of the first numerical impulse of said line relay to open said pre-operating circuit of said change-over relay.

References Cited in the file of this patent

UNITED STATES PATENTS

| | | |
|---|---|---|
| 1,938,381 | Gillings | Dec. 5, 1933 |
| 2,541,936 | Powell | Feb. 13, 1951 |